United States Patent Office 2,945,524
Patented July 19, 1960

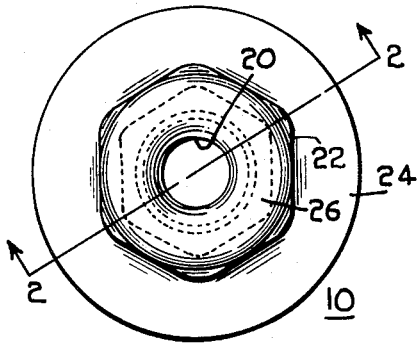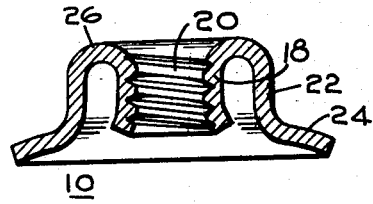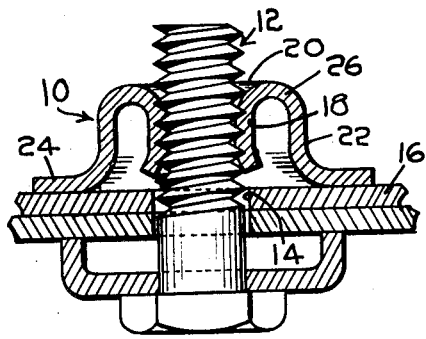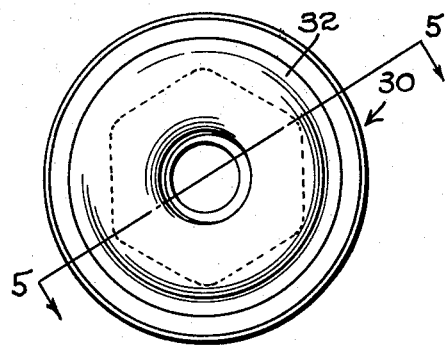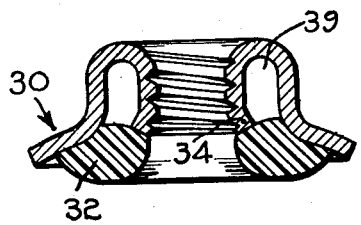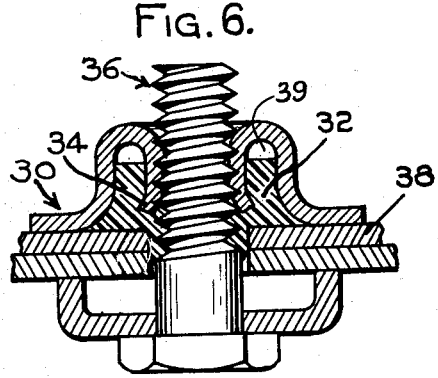
INVENTOR:
PHILIP D. BECKER,
BY Robert E Ross
ATTORNEY.

2,945,524

SHEET METAL LOCK NUT WITH DEFORMABLE FLANGE AND SEALING MATERIAL

Philip D. Becker, Hingham, Mass., assignor to United-Carr Fastener Corporation, Boston, Mass., a corporation of Delaware Filed July 5, 1955, Ser. No. 519,853

1 Claim. (Cl. 151—38)

This invention relates generally to fastening devices and has particular reference to an improved nut.

Sheet metal nuts of various types are used in many applications in the construction of automobiles, appliances, and the like, however, such nuts have the disadvantage of having insufficient strength for many purposes, and they are not readily adaptable for sealing the bolt aperture.

The object of the invention is to provide a nut which may be formed of sheet metal having increased strength in engaging the bolt or screw over previous nuts of this type.

Another object of the invention is to provide a one-piece nut having means for resiliently bearing against the panel through which the bolt extends.

A further object of the invention is to provide a one-piece nut having a ring of mastic sealing material assembled therewith to seal the bolt aperture.

Other objects of the invention will, in part, be obvious, and will, in part, appear hereinafter.

In the drawing:

Fig. 1 is a top plan view of a nut embodying the features of the invention;

Fig. 2 is a view in section taken on line 2—2 of Fig. 1;

Fig. 3 is a view in section partly in elevation of the nut of Fig. 1 assembled onto a bolt;

Fig. 4 is a bottom plan view of the nut of Fig. 1 with a ring of mastic sealing material assembled therewith;

Fig. 5 is a view in section taken on line 5—5 of Fig. 4; and

Fig. 6 is a view in section of the nut of Fig. 5 assembled onto a bolt.

Referring to Figs. 1 through 3 of the drawing, there is illustrated a nut device 10 which is adapted for assembly onto a threaded bolt 12 extending through an opening 14 in a panel 16.

In the preferred embodiment the nut 10 is formed of a single piece of material and comprises a medial barrel portion 18 having a threaded aperture 20 extending therethrough, an outer wall portion 22 disposed about the barrel in lateral spaced relation, and a radial flange 24 disposed on the bottom end of the wall. The wall 22 and the barrel 18 are joined at the upper ends by a lateral portion 26, and the wall may have a generally polygonal shape to permit engagement by a wrench. The flange 24 extends outwardly and downwardly from the wall below the plane of the lower end of the barrel. In the preferred embodiment the flange 24 is rounded downwardly toward the edges to provide a lower surface which is generally concave in cross-section.

When the nut 10 is assembled onto the bolt 12 and tightened against the panel 16, the outer edge of the flange bears first against the panel, and as the nut is tightened further the flange flexes upwardly. The effect of the engagement of the flange with the panel is to provide a friction lock, both by the resistance to rotation of the nut due to the frictional engagement with the panel, and the constant axial force between the threads of the bolt and the threads of the nut due to the flexed flange. The frictional engagement of the flange is also made more effective in resisting rotation by the relatively large radius of the flange.

An important feature of the present construction is the fact that the flexed flange permits slight rotation of the nut in the off direction without destroying the frictional engagement between the nut and the panel.

The frictional engagement between the threads is dependent on the engagement of the flange with the panel, hence, the nut is relatively free spinning on the bolt until such engagement occurs.

The illustrated nut is particularly adapted for receiving a mastic material for sealing the panel aperture. Referring to Figs. 4 through 6, there is illustrated a nut 30 which is similar to the nut 10 previously described, with the exception that a ring of mastic sealing material 32 is provided on the lower side of the nut between the lower end 34 of the barrel and the outer wall and may extend under the flange if desired.

The particular sealing material used may be any of several well-known types and the composition thereof does not form part of the present invention. In some cases a ring of deformable plastic of suitable shape may be used.

When the nut 30 is tightened into a threaded bolt 36 extending through a panel 38, the mastic material is confined by the engagement of the other edge of the flange with the panel, and as the nut is tightened against the panel, the mastic material is squeezed inwardly to substantially fill the space between the barrel and the wall, except for the space 39 as shown in Fig. 6, occupied by the air compressed therebetween, and becomes disposed about the threads of the bolt 36 and seals the panel aperture. The space 39 is shown in Fig. 5 with the mastic in position prior to assembling the nut. Thus in normal use no mastic is forced outwardly from under the flange 24 to soil the surrounding work area and foul the tools, and the space between the barrel 18 and the wall 22 acts as a recess into which the excess mastic is forced compressing any trapped air above it in recess 39. When such air is trapped and compressed by the mastic, it exerts pressure on the mastic which assists in forcing the mastic into the threads between the bolt 36 and barrel 34 and the spaces between the bolt 36 and the workpiece 38.

It is desirable to have the lower end of the barrel disposed an appreciable distance above the panel when the nut is assembled so that the mastic material may flow freely about the threads of the bolt and into any gap between the bolt and the panel, such flow of course being assisted by the pressure of the entrapped air when temperature conditions allow the plastic to flow.

Another important feature of the present construction is the elongated barrel, which greatly increases the strength of the nut in engaging a bolt over previous nuts of this type by reason of the greater number of threads and the strength of the connecting portion 26 joining the threaded barrel and the outer wall.

Since certain other obvious modifications may be made in this device without departing from the scope of the invention, it is intended that all matter contained herein be interpreted in an illustrative and not a limiting sense.

I claim:

A sealing nut device for assembly onto a threaded member extending through a panel opening comprising a preassembled sheet metal nut and a thread sealer forming a two-piece assembly only, said nut having an outer barrel portion, an inner barrel portion disposed within said outer barrel portion in spaced, substantially parallel relationship therewith, said inner and outer barrel portions being united at one end thereof by an imperforate portion, the inner surface of said inner barrel portion being threaded forming an axially extending threaded central bore in the nut for receiving a threaded bolt therein, and an outwardly and downwardly extending deformable flange portion joined to the opposite end of said outer barrel portion and lying below the free end of said inner barrel portion, and a rim of adhesive mastic sealing compound seated on and extending between the free end of the inner barrel portion and the outer barrel portion and the inside face of said flange portion, thereby forming a closed air chamber between said inner and outer barrel portions, said sealing compound being confined within the flange when the flange contacts the panel and being of sufficient volume to be squeezed inwardly around the threaded nut and into the closed air chamber between the inner and outer barrel portions when the flange is flattened by tightening the nut against the panel, whereby the air trapped in said closed air chamber acts as a compressible fluid accommodating displaced matter and exerting pressure thereon to and in, forcing said mastic into small spaces around said threaded member.

References Cited in the file of this patent

UNITED STATES PATENTS

| | | |
|---|---|---|
| 154,851 | Dittman | Sept. 8, 1874 |
| 916,284 | Eden | Mar. 23, 1909 |
| 1,505,580 | Bronson | Aug. 19, 1924 |
| 1,652,235 | Bronson | Dec. 13, 1927 |
| 1,679,844 | Volckhausen | Aug. 7, 1928 |
| 1,872,014 | Schjolin | Aug. 16, 1932 |
| 2,287,691 | Marchou | June 23, 1942 |
| 2,718,691 | Sussenbach | Sept. 27, 1955 |
| 2,734,547 | Hotchkin | Feb. 14, 1956 |
| 2,742,939 | Larson | Apr. 24, 1956 |
| 2,761,349 | Heller | Sept. 4, 1956 |